United States Patent
Schäfer et al.

(10) Patent No.: US 12,263,441 B2
(45) Date of Patent: Apr. 1, 2025

(54) SYSTEM COMPOSED OF AN APPARATUS FOR TREATING A FLUID, A HANDHELD DEVICE AND A METHOD FOR OPERATING SUCH A SYSTEM

(71) Applicant: Donaldson Filtration Deutschland GmbH, Haan (DE)

(72) Inventors: Jens Schäfer, Korschenbroich (DE); Abdelkhalic Rbayti, Düsseldorf (DE)

(73) Assignee: Donaldson Filtration Deutschland GmbH, Haan (DE)

( * ) Notice: Subject to any disclaimer, the term of this patent is extended or adjusted under 35 U.S.C. 154(b) by 0 days.

(21) Appl. No.: 18/087,628

(22) Filed: Dec. 22, 2022

(65) Prior Publication Data
US 2023/0182071 A1    Jun. 15, 2023

Related U.S. Application Data

(63) Continuation of application No. 16/479,879, filed as application No. PCT/EP2018/051414 on Jan. 22, 2018, now Pat. No. 11,534,716.

(30) Foreign Application Priority Data
Jan. 23, 2017   (DE) .......................... 102017000519.2

(51) Int. Cl.
*G05B 19/042*   (2006.01)
*B01D 53/04*   (2006.01)
(Continued)

(52) U.S. Cl.
CPC ......... *B01D 53/30* (2013.01); *B01D 53/0415* (2013.01); *B01D 53/0454* (2013.01);
(Continued)

(58) Field of Classification Search
CPC .......................... B01D 53/04; B01D 53/0415; B01D 53/0454; B01D 53/261; B01D 53/30;
(Continued)

(56) References Cited

U.S. PATENT DOCUMENTS 9,423,146 B2    8/2016   Bruce et al.
9,489,836 B2   11/2016   Huang et al.
(Continued)

FOREIGN PATENT DOCUMENTS

AU   2005201098   9/2005
CN   1058545      2/1992
(Continued)

OTHER PUBLICATIONS

"Einvau-und Betriebsanleitung JUDO i-soft plus," Judo Wasserenthartung GmbH, Sep. 30, 2016, retrieved from URL <https://judo.eu/wp-content/uploads/2016/09/1702511.pdf> on Mar. 29, 2018 (52 pages).

(Continued)

*Primary Examiner* — Frank M Lawrence, Jr.
(74) *Attorney, Agent, or Firm* — Pauly, DeVries Smith & Deffner LLC

(57) ABSTRACT

The invention relates to a system composed of an apparatus to treat a fluid and a handheld device, wherein the apparatus has a communication unit with a radio antenna and the handheld device has a communication unit with a radio antenna and both communication units can exchange data with each other by means of radio communication, and the apparatus has a control unit, which can detect at least one status parameter of the apparatus and generate a signal which is dependent on the status parameter and can transfer it via the communication unit of the apparatus to the communication unit of the handheld device.

12 Claims, 1 Drawing Sheet

(51) Int. Cl.
  *B01D 53/26* (2006.01)
  *B01D 53/30* (2006.01)
  *G08C 17/02* (2006.01)
  *H04W 4/80* (2018.01)
  *H04W 84/12* (2009.01)
  *H04W 88/02* (2009.01)

(52) U.S. Cl.
  CPC ......... *B01D 53/261* (2013.01); *G05B 19/042* (2013.01); *H04W 4/80* (2018.02); *B01D 2257/80* (2013.01); *G05B 2219/25196* (2013.01); *H04W 84/12* (2013.01); *H04W 88/02* (2013.01)

(58) Field of Classification Search
  CPC .............. B01D 2257/80; G05B 19/042; G05B 2219/25196; G08C 17/02; G08C 2201/50; H04W 4/80; H04W 84/12; H04W 88/02
  USPC ...... 95/1, 8, 10–14, 19, 21, 23, 117; 96/108, 96/121, 109, 111–114; 34/80, 472, 473
  See application file for complete search history.

(56) References Cited

U.S. PATENT DOCUMENTS

| | | |
|---|---|---|
| 2013/0118487 A1 | 5/2013 | Huh |
| 2014/0262130 A1 | 9/2014 | Yenni et al. |
| 2015/0202565 A1 | 7/2015 | Qi et al. |
| 2015/0235545 A1 | 8/2015 | Schoenheit et al. |
| 2016/0052798 A1 | 2/2016 | Downs et al. |
| 2016/0096138 A1 | 4/2016 | Martin et al. |
| 2020/0246751 A1 | 8/2020 | Schäfer et al. |

FOREIGN PATENT DOCUMENTS

| | | |
|---|---|---|
| CN | 1287250 | 3/2001 |
| CN | 101639250 | 2/2010 |
| CN | 101666023 | 3/2010 |
| CN | 102766910 | 11/2012 |
| CN | 103971072 | 8/2014 |
| CN | 104272048 | 1/2015 |
| CN | 104995460 | 10/2015 |
| CN | 105682947 | 6/2016 |
| CN | 106232202 | 12/2016 |
| EP | 2591827 | 5/2013 |
| EP | 2778439 | 9/2014 |
| EP | 3076093 | 10/2016 |
| JP | 2013135407 | 7/2013 |
| WO | 2015092409 | 6/2015 |
| WO | 2018134394 | 7/2018 |

OTHER PUBLICATIONS

"Fernbedienung des i-soft plus," Judo Wasseraufbereitung GmbH, Sep. 30, 2016, retrieved from URL <https://judo.eu/wp-content/uploads/2016/09/1702574.pdf> on Mar. 29, 2018 (16 pages).

"First Office Action," for Chinese Patent Application No. 201880008095.8 mailed Mar. 8, 2022 (20 pages) with English Translation.

"Intelligentes weiches Wasser Die enthartungsanlagen der JUDO i-soft Serie," Judo Wasserenthartung GmbH, Sep. 5, 2016, retrieved from URL <https://judo.eu/wp-content/uploads/2016/09/1931377.pdf> on Mar. 29, 2018 (12 pages).

"International Preliminary Report on Patentability," for PCT Application No. PCT/EP2018/051414 mailed Jul. 23, 2019 (9 pages).

"International Search Report and Written Opinion," for PCT Application No. PCT/EP2018/051414 mailed Apr. 16, 2018 (16 pages).

"Non-Final Office Action," for U.S. Appl. No. 15/479,879 mailed Apr. 4, 2022 (17 pages).

"Notice of Allowance," for U.S. Appl. No. 15/479,879 mailed Aug. 10, 2022 (9 pages).

"Notice of Opposition," for European Patent Application No. 18701161.4 on behalf of Kaeser Kompressoren SE, mailed Sep. 9, 2021 (41 pages).

"Response to Non Final Office Action," for U.S. Appl. No. 16/479,879, filed Jun. 28, 2022 (8 pages).

The Opposition Division, Interlocutory decision in Opposition Proceedings, pp. 1-101, Feb. 1, 2023, European Patent Office.

"Interlocutory Decision in Opposition Proceedings," for EP Patent Application No. 3571554, filed on Jan. 2, 2023 (101 pages).

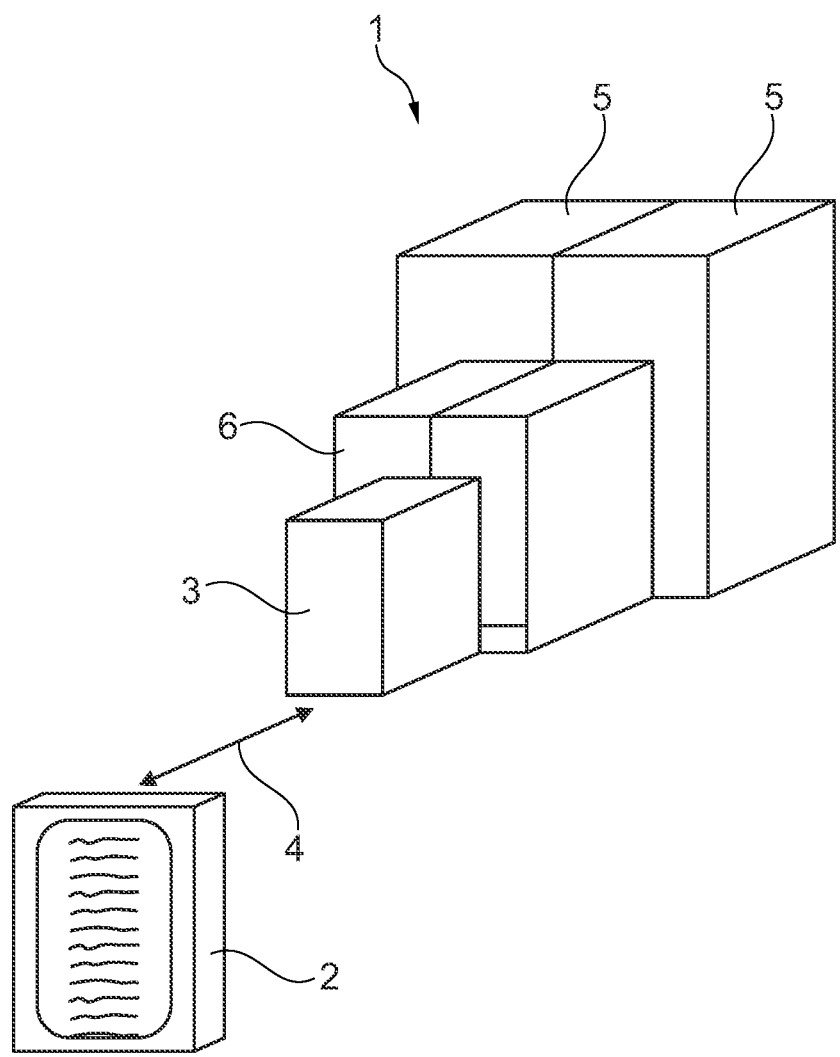

SYSTEM COMPOSED OF AN APPARATUS FOR TREATING A FLUID, A HANDHELD DEVICE AND A METHOD FOR OPERATING SUCH A SYSTEM

CROSS REFERENCE TO RELATED APPLICATIONS

This application is a continuation of U.S. patent application Ser. No. 16/479,879, filed Jul. 22, 2019, which is a U.S. National Stage Application under 35 U.S.C. 371 of International Patent Application No. PCT/EP2018/051414 filed Jan. 22, 2018, which claims priority to German Patent Application No. DE 102017000519.2, filed Jan. 23, 2017, the contents of which are herein incorporated by reference in its entirety.

The invention relates to a system composed of an apparatus for treating a fluid and a handheld device and a method for operating such a system.

BRIEF DESCRIPTION OF THE FIGURES

FIG. 1 is a perspective schematic view of the system according to the invention.

Apparatuses for drying and filtering a fluid are known in various designs. In one preferred embodiment, such apparatuses are embodied as sorption driers.

Sorption driers generally serve to remove moisture from a fluid and, in particular, a compressed fluid such as e.g. compressed air. When compressed air is generated, a compressor sucks in ambient air and compresses it. The compression of the sucked-in ambient air causes the compressed air to be saturated with moisture. Part of this moisture condenses in an aftercooler of the compressor and is discharged from the compressed air system via discharge systems. The cooling of the compressed air in the pipeline system between the compressor and the consumer results in the further formation of condensate. This can give rise to negative accompanying phenomena in the following use of the compressed air, which phenomena can bring about increased maintenance expenditure or reductions in quality. Applications which make stringent requirements of the cleanliness of the compressed air, such as for example applications in the foodstuff industry, pharmaceutical industry or in semiconductor technology, therefore frequently require additional systems for drying the compressed air which are usually integrated into the compressed air system between the aftercooler of the compressor and the consumer network. These drying systems serve to feed the compressed air virtually free of moisture into the compressed air system.

Known sorption driers usually have at least two containers in which desiccant (sorbent)—frequently in a bulk form of the granulate desiccant—is arranged. Adsorptive desiccants are frequently used, wherein absorptive desiccants can also be used. The two containers are connected to one another in parallel by lines and are each connected to the inlet of the fluid to be dried and the outlet of the dried fluid. The flow path of the fluid is controlled by means of valves. The control of the valves is performed by a control unit. The control of the valves is configured here in such a way that there is always a flow of the fluid to be dried through a container. The fluid is dried in said container in that the moisture which is contained therein is bound by the desiccant contained in the container. In this phase, this container is therefore in a sorption or drying phase. During the sorption phase of the one container, a part of the dried fluid (usually) flows through the other container in the opposite direction, in order to dry, i.e. to regenerate, the sorbent which is saturated during a previous sorption phase. This container is consequently in the regeneration phase. If the sorbent is dried without an external supply of thermal energy, i.e. merely by a partial flow of the fluid which has been dried in advance, this is what is referred to as cold regeneration. After a predefined time period which is dependent on the loading of the sorption drier, it is necessary to change over the control of the valves in the feed lines and discharge lines in such a way that that container which was previously in the sorption phase is regenerated, and the container which was previously regenerated is now used to dry the fluid.

In addition, warm regeneration of a sorption drier is known from the prior art. In this context, the sorption container which is in the regeneration phase is regenerated by air which has been heated by supplying external energy. The air can be either a partial flow of the dried compressed air or it is e.g. also possible to use ambient air. Electrical heating devices are routinely used to heat the regeneration air in conjunction with the warm regeneration.

Furthermore, it is known to connect a further cleaner stage, filled with various adsorption media or catalytic converters such as e.g. activated carbon, downstream of such sorption driers or other drying systems, which cleaner stage filters out further undesired components of the dried fluid, such as for example oil vapour. In this context, adsorption media which are not desiccants, that is to say do not absorb any moisture, in particular no water or water vapour, and catalytic converters are understood to be cleaning means because they can remove further undesired components of the dried fluid, in particular liquid, vapour-like or gas-like substances from the fluid. The media which are also used for filtering the fluid in such apparatuses in the prior art and whose task it is to remove solids, in particular particles, from the fluid are differentiated from this.

From the prior art it is known that apparatuses for drying and filtering have displays which can represent a status parameter of the apparatus. Such display means can be scales, digital displays, but also displays. Displays in the form of lamps are likewise conceivable, which can indicate a status parameter of the apparatus either through their colouring (for example red, green, orange) or else through their operating state (on or off).

Such apparatuses preferably maintained at regular intervals or as a function of the operating hours, wherein as part of the maintenance it is also possible to exchange consumables such as, for example, the desiccant or the cleaning agent or the filter.

Against this background, the object of the invention has been to improve the operation of such an apparatus.

The invention is based on the basic concept of providing a handheld device in addition to the apparatus for treating a fluid, and of permitting a control unit of the apparatus to exchange a signal with the handheld device via a direct radio link between the handheld device and the apparatus or via a computer network or via a cable connection between the handheld device and the apparatus, for example in that the handheld device can exchange a signal with the computer network via a radio link or via a cable, and the apparatus exchanges data with the computer network via a radio link or via a cable.

The invention also provides the advantage that a service technician can be equipped with a handheld device and can use this handheld device at his respective place of use to read out the status parameter of the respective apparatus on which he is performing maintenance. For this purpose, not even visual contact with the apparatus is necessary.

This provides inter alia the possibility of the control unit of the apparatus being able to be embodied in a simpler way when the evaluation of the status parameter is carried out by the handheld device and not by the control unit. The handheld device can be, for example, a portable computer, particularly preferably a tablet computer or a smartphone. With the invention it becomes possible to reduce the complexity of the control unit of the apparatus in proportion with the increase in computer power of the handheld device. This provides the advantage, in particular for operators of a plurality of apparatuses for treating a fluid, that the respective apparatus can be made more favourable since the control unit of the respective apparatus can be simplified, while the evaluation of the status parameters can be carried out by means of the computer power of the handheld device. Since it is possible to connect the handheld device to a plurality of apparatuses by means of the radio link to the control unit of the respective apparatus, the status parameters of a plurality of apparatuses can be evaluated with a single handheld device.

In one preferred embodiment, the apparatus to treat a fluid has a fluid inlet and a fluid outlet and specifies a flow path through the apparatus between the fluid inlet and the fluid outlet, wherein the flow path leads through means of treatment, especially means for cleaning, in particular, means for drying and/or through means for filtering the fluid. The flow path can also be embodied in a branched fashion and have parallel sub-paths.

The apparatus is particularly preferably a sorption drier. The apparatus particularly preferably has a bulk form of desiccant, particularly preferably of granulate desiccant, as means to dry. The desiccant is particularly preferably at least partially arranged in a replaceable cartridge. In one preferred embodiment, the desiccant is adsorptive, absorptive or is composed of a mixture of adsorptive and absorptive desiccant.

Treatment of a fluid is understood to be the removal of a component of the fluid. The treatment can be filtering (filtration) in which substances which have a different aggregate state than the other substances of the fluid are removed from the fluid, that is to say, in the case of an essentially gaseous fluid, solid particles or liquid particles are removed from the essentially gaseous fluid, and, in the case of an essentially liquid fluid, solid particles are removed from the essentially liquid fluid. Filtering can be carried out, in particular, by way of coalescence filtration, particle filtration or process filtration. The treatment can be cleaning in which gaseous or vaporous components are removed from gases. Cleaning can particularly preferably be carried out by way of adsorption, absorption, catalysis or condensation. The treatment can be separation in which liquid components are removed from liquids. A separation process can particularly preferably be membrane separation, adsorption, sedimentation or flocculation.

In one preferred embodiment, catalytic converters, in particular activated carbon, are used as the means for cleaning catalytic converters. The desiccant can be a coalescence medium. In one preferred embodiment of a desiccant which is embodied as a coalescence medium, a drainage layer is additionally provided. The desiccant can be suitable for heat drying. The desiccant can be suitable for refrigeration drying. The desiccant can be a membrane, for example for membrane drying.

In one preferred embodiment, both communication units exchange data by means of radio signals according to the Bluetooth standard, NFC standard or a standard belonging to the IEEE-802.11 family. The use of such a radio standard permits handheld devices which are already commercially available to be used, these being, for example, laptops, tablet computers or mobile radio devices, such as, for example, smartphones. In particular, the use of radio signal according to the Bluetooth standard or the NFC standard permits satisfactory identification of the apparatus with which the handheld device communicates, since these standards require a certain spatial proximity between the one communication unit and the other communication unit. This provides, in particular in the case of operators of a plurality of apparatuses for treating a fluid, the advantage that the handheld device only ever communicates with such an apparatus if the apparatuses are spatially so far apart from one another that the handheld device can in each case receive only the Bluetooth signal or the NFC signal of an apparatus. In order to identify the respective apparatus with which communication is to be carried out, it is also conceivable to provide an identifier, for example a QR code, on the apparatus, of which a photograph can be taken by means of a camera on the handheld device and which can be converted by the handheld device into information which the handheld device requires to enter into contact with the communication unit of the apparatus, such as, for example, Bluetooth identifiers or passwords.

Additionally or alternatively, the apparatus has a communication unit with a cable connection for a computer network, and the handheld device has a communication unit with a radio antenna or a cable connection, via which it can be connected to the computer network, and the two communication units can exchange data with one another via the computer network. It is therefore possible for the apparatus to be integrated, for example, into a local computer network via a LAN cable, and for the communication unit either to be connected to this computer network likewise via a LAN cable or via a WLAN connection.

In one preferred embodiment, the handheld device has another communication unit with a radio antenna, with which the handheld device can exchange data via a mobile communications network. The handheld device is particularly preferably a mobile radio device, particularly preferably a smartphone. The use of such a handheld device permits the operator to use the handheld device to exchange data via a mobile communications network. In a preferred embodiment, data is unidirectional or bidirectional between the apparatus and the handheld, preferably by way of communication between the communication units of the apparatus and the handheld, and is exchanged unidirectional or bidirectional between the handheld and a mobile communications network, preferably to a computer or a server that can exchange data over the mobile communications network. In a preferred embodiment, the only way for the apparatus to exchange data with a remote computer or a remote server, which does not form part of a local network that might be present at the site of the apparatus, is via the handheld. This allows the exchange of data to be controlled on the one hand. On the other hand, it allows the site of the apparatus be kept simple. The apparatus does not need to be connected to a local area network or the local area network does not need to be equipped to communicate data to a remote computer or a remote server, because the communication with a remote server or a remote computer can be made via the handheld. Also, communicating between the apparatus and a remote computer or a remote server via the handheld allows for enhanced security. The handheld can be programmed to produce an input request to the operator of the handheld, once the handheld receives data from the apparatus, the input request requesting the operator to confirm that this data is to be exchanged with the mobile communications network with a remote server or a remote computer. Likewise, the handheld can be programmed to produce an input request to the operator of the handheld, once the handheld receives data a remote server or a remote computer via the mobile communications network, the input request requesting the operator to confirm that this data is to be exchanged with the apparatus. Without positive confirmation of the operator, these embodiments allow the apparatus to be invisible to remote computers or remote servers. The operator keeps full control of the type of data and the time of data that is exchanged.

For example, one embodiment is possible in which the system detects the need for the exchange of a consumable on the basis of the status parameter. This need can be represented to the operator on a display of the handheld device and connected to an input request. If the operator responds in a specific way to the input request, the handheld device can exchange data with a control centre via a mobile communications network, on the basis of which data a supplier supplies the operator with, for example, a new consumable or sends a maintenance technician to the operator. It is also conceivable for the system to detect, on the basis of the status parameter, a specific operating state of the apparatus which requires a positioning intervention. This fact can be presented to the operator on a display of the handheld device together with an input request. Depending on the response to the input request, the handheld device can exchange data with a control centre, for example a call centre, via a mobile communications network. The call centre can then, for example, enter into contact with the operator and provide him with explanations about the positioning intervention to be carried out, or, for example, cause a servicing technician to be sent to the operator.

The data which is exchanged via the mobile communications network, for example with a control centre, can be status parameters of the apparatus, for example information about the operating hours since the last maintenance operation, information about the operating hours of the means for cleaning, in particular for drying, or means for filtering the fluid, which are possibly provided in the apparatus, and information about pressure statuses or temperature statuses in the apparatus or a fault protocol. Likewise, the data which is exchanged via a mobile communications network can be data which identifies the apparatus itself, that is to say, for example, identifies the model type of the apparatus or the operator of the apparatus. Data can also be transmitted from the mobile communications network to the handheld device, this data being, for example, maintenance tips or explanations as to what settings are to be made on the apparatus.

Data which can also be exchanged via a mobile communications network, for example with a service centre or a maintenance team, comprises the calling or providing of a specific maintenance service, the exchange with respect to maintenance parts which are to be used, including the article numbers, information about faults which have occurred on the apparatus, and proposals regarding the remedying of the faults. Likewise, data which triggers the ordering of a component or the execution of a specific servicing intervention by a maintenance technician can be exchanged by means of the data exchange with the mobile communications network.

In one preferred embodiment, the apparatus has at least one of the measurement elements indicated in the list below:

temperature element for measuring the fluid temperature at a measuring point within the apparatus;

temperature element for measuring the temperature of the means for cleaning, in particular, for drying, or the means for filtering the fluid;

pressure sensor for detecting the pressure of the fluid at a measuring point;

operating-hours meter switched on since a preceding event, for example since preceding maintenance or a preceding exchange of means for drying the fluid arranged in cartridges;

power consumption meter;

measurement element for determining fluid composition (e.g. CO sensors, $CO_2$ sensors or $O_2$ sensors);

volume flow meter, hygrometer position measurement device or position sensor of positioning devices of the apparatus, for example of valves installed in the apparatus, differential pressure gauge.

In one preferred embodiment, the handheld device has a database stored on a non-volatile memory. This permits, for example, action recommendations to be stored on the handheld device itself. As a result, depending on the signal exchanged between the communication units of the apparatus and of the handheld device, it is possible to output on a display of the handheld device action recommendations as to which positioning interventions can be performed on the apparatus in order to establish or restore a specific operating state. The database can also be stored centrally on a server which the handheld device accesses by exchanging data via a mobile communications network. Manuals can also be stored in the non-volatile memory. However, with respect to the manuals it is also conceivable for them to be stored in a non-volatile memory of the apparatus and to be able to be transmitted to the handheld device via radio.

In addition to the signal which is dependent on a status parameter, the communication unit of the apparatus and the communication unit of the handheld device can exchange further data. For example, the communication units can exchange data with one another which identifies the model type of the apparatus or else identifies the specific apparatus, for example by transferring a serial number. Information about the type of spare parts to be used can be exchanged or about components which are installed in the apparatus, such as the specifically installed filter element or the specifically installed silencers.

In one preferred embodiment, the apparatus has a display. Fields of use are conceivable in which the apparatus displays information about its current operating state or information about a status parameter of the apparatus on a display of the apparatus continuously or at the push of a button. The operator of an apparatus can use such a display to provide information quickly about the status of the apparatus. Even an operator who does not have a handheld device can in this way obtain information about the status of the apparatus, in order, if necessary, then to call a servicing technician who reads out further information from the apparatus with his handheld device.

In one preferred embodiment, the communication unit of the apparatus can be transferred from a state of rest, in which it is either completely switched off or in a status of low current consumption, into an active state and can in turn switch into a state of rest from the active state. The state of rest can be embodied, for example, in such a way that the communication unit of the apparatus checks at relatively long time intervals, for example every 10 minutes, whether an interrogation signal for resumption of communication is present from a handheld device. If the communication unit of the apparatus which is in the state of rest detects such an interrogation signal, the communication unit of the apparatus could switch into the active state and set up communication with the communication unit of the handheld device. Such a possibility provides the advantage of saving energy. Additionally or alternatively, an embodiment is possible in which the communication unit of the apparatus can be switched off completely, for example by means of a switch. Communication between the communication units of the apparatus and of the handheld device is not possible until the communication unit of the apparatus is activated. This also provides, on the one hand, the possibility of saving further current. In addition, in this way it is possible to implement a security concept, specifically if it is necessary to input a code or to use a key, a chip card or the like to activate the communication unit of the apparatus.

The method according to the invention for operating the system according to the invention provides that the control unit detects a status parameter of the apparatus and generates a signal dependent on the status parameter and transmits it to the communication unit of the handheld device via the communication unit of the apparatus. In one preferred embodiment there is provision that the handheld device exchanges data via a mobile communications network after receiving the signal via the radio antenna of the other communication unit of the handheld device.

In one preferred embodiment, after receiving the signal via the radio antenna, the handheld device generates a response signal which it transfers to the communication unit of the apparatus via the communication unit of the handheld device. The response signal can be, on the one hand, a confirmation signal that the signal which was firstly transferred from the communication unit of the apparatus to the communication unit of the handheld device has been received. In one preferred embodiment, the response signal is transmitted from the communication unit of the apparatus to the control unit of the apparatus, after which the control unit of the apparatus places a positioning element of the apparatus depending on the response signal. This makes it possible for the handheld device to perform positioning interventions on the apparatus. In this context, there is provision in a first embodiment that the response signal is generated solely after an input at the handheld device, for example if the operator of the handheld device selects one of a plurality of possibilities for positioning a positioning element of the apparatus, said possibilities being displayed on a display. In an alternative embodiment it is conceivable for the response signal to be generated solely on the basis of data which the handheld device has received from a mobile communications network. As a result, there is the possibility for a service centre which can exchange data with the handheld device to be provided via the handheld device with the possibility of making positioning interventions at the apparatus.

Possible positioning interventions at the apparatus can be all the settings which are possible at the controller, such as for example changes of the program cycles, of time schedules, of adjustment parameters such as, for example, of the pressure, the temperature, or the dew point, with respect to which planned actions take place, such as for example switching over, servicing intervals, servicing confirmations.

In particular, means for cleaning, in particular drying and/or means for filtering which are part of an exchangeable component, are provided as part of the apparatus, and are particularly preferably arranged in a cartridge. In particular in the case of apparatuses with such cartridges, the advantages of the invention can be implemented particularly well since in such apparatuses the cartridges usually have to be exchanged and subsequently ordered.

The invention is explained in more detail below with reference to a drawing which illustrates merely one exemplary embodiment. The single FIGURE of the drawing shows a perspective schematic view of the system according to the invention.

The system according to the invention has an apparatus for treating a fluid 1 and a handheld device 2. The apparatus 1 has a communication unit 3 with a radio antenna. In addition, the handheld device has a function unit (not illustrated in more detail) with a radio antenna. The two communication units can exchange data with one another by means of radio (indicated symbolically by the arrow 4).

The apparatus 1 has a fluid inlet (not illustrated in more detail) and a fluid outlet (not illustrated in more detail). Between the fluid inlet and the fluid outlet the apparatus specifies a flow path (not illustrated in more detail) through the two desiccant containers 5 and the two filters 6.

In a control unit (not illustrated in more detail) of the apparatus 1, the operating hours since a cartridge of a desiccant container 5 has been replaced are counted as status parameters of the apparatus. If the counted operating hours reach a previously input value, the control unit generates a signal which can be transferred via the communication unit of the apparatus to the communication unit of the handheld device 2. In response to this, a message is displayed on the display of the handheld device 2 to the effect that a cartridge of a desiccant container 5 of the apparatus 1 has to be exchanged. At the same time, it is possible to display on the display of the handheld device 2 an input request which requests whether a new cartridge is to be supplied by a service team. If this input request is responded to in the affirmative, the handheld device can exchange data via a mobile communications network, via a further communication unit (not illustrated in more detail) which has a further radio antenna, and can enter into contact with a service team, which is informed about what type of cartridge is to be supplied for what type of apparatus to which operator and at which location of the operator.

In an alternative operating state, the control unit can detect a malfunction of the apparatus by detecting status parameters of the apparatus, and in response generate a signal which is transmitted via the communication unit of the apparatus 1 to the communication unit of the handheld device 2. This malfunction can be displayed on the display of the handheld device 2. In this context, the handheld device can output an action recommendation as a function of the present malfunction by accessing a database which is stored on a non-volatile memory. In addition, it is possible to display on the display of the handheld device an input request whose confirmation permits contact to be established with a service centre or a maintenance technician. This contact can be made via the exchange of data via a mobile communications network, wherein an exchange of data is also to be understood as making a telephone call. In this context it is, in particular, possible that, on the one hand, the handheld device exchanges data for a telephone call when data is exchanged via the mobile communications network, but in parallel with this it also exchanges data which identifies, for example, the model type of the apparatus, the location of the apparatus or, for example, the operator of the apparatus, with the result that during the telephone call a service centre or maintenance personnel are already provided with information about the apparatus or, for example, also about the detected malfunction.

The invention claimed is:

1. A method to operate a system, whereby the system is composed of an apparatus to treat a fluid and a handheld device, wherein the apparatus has a communication unit with a radio antenna and the handheld device has a communication unit with a radio antenna and both communication units can exchange data with each other by means of radio communication and the apparatus has a control unit, which can detect at least one status parameter of the apparatus and generate a signal which is dependent on the status parameter and can transfer it via the communication unit of the apparatus to the communication unit of the handheld device; wherein the method comprises the following steps:

the control unit detects a status parameter of the apparatus and generates a signal dependent on the status parameter and transmits the signal to the communication unit of the handheld device via the communication unit of the apparatus, whereby the handheld device after receiving the signal via the radio antenna of the communication unit of the handheld device generates a response signal which it transfers to the communication unit of the apparatus via the communication unit of the handheld device, characterized in that the response signal is transmitted from the communication unit of the apparatus to the control unit of the apparatus and the control unit of the apparatus places a positioning element of the apparatus depending on the response signal, wherein the handheld device has another communication unit with a radio antenna, with which the handheld device can exchange data via a mobile communications network and wherein the handheld device after receiving the signal exchanges data via a mobile communications network via the radio antenna of the another communication unit, wherein the data which is exchanged via the mobile communications network are the status parameters of the apparatus, and wherein the only way for the apparatus to exchange data with a remote computer or a remote server, which does not form part of a local network that is present at the site of the apparatus, is via the handheld device.

2. The method according to claim 1, characterized in that the apparatus additionally has a communication unit with a cable connection and the handheld device has a communication unit with a radio antenna or a cable connection, via which it can be connected to a computer network and the communication unit of the apparatus can be connected to the computer network via a cable, and both communication units can exchange data with each other via the computer network or the handheld device can be connected to the cable connection of the apparatus via a cable connected to the cable connection of the handheld device and both communication units can exchange data with each other via the cable.

3. The method according to claim 1, characterized in that the apparatus to treat a fluid has a fluid inlet and a fluid outlet and specifies a flow path through the apparatus between the fluid inlet and the fluid outlet, wherein the flow path leads through means to dry and/or through means to filter the fluid.

4. The method according to claim 1, characterized in that each of the communication units exchange data by means of radio signals according to the Bluetooth standard, NFC standard or a standard belonging to the IEEE-802.11 family.

5. The method according to claim 3, characterized in that the apparatus has at least one of the following measurement elements:

a temperature element to measure the fluid temperature on a measuring point within the apparatus;

a temperature element to measure the temperature of the means to dry or the means to filter the fluid;

a pressure sensor to detect the pressure of the fluid at a measuring point;

an operating-hours meter switched on since a preceding maintenance or a preceding exchange of means to dry the fluid arranged in cartridges;

a power consumption meter;

a measurement element to determine fluid composition including one or more of CO sensors, $CO_2$ sensors or $O_2$ sensors;

a volume flow meter;

a hygrometer;

a position measurement device or position sensor of positioning devices of valves installed in the apparatus; and a differential pressure gauge.

6. The method according to claim 1, characterized in that the handheld device has a database stored on a non-volatile memory.

7. A method to operate a system, whereby the system is composed of an apparatus to treat a fluid and a handheld device, wherein the apparatus has a communication unit with a radio antenna and the handheld device has a communication unit with a radio antenna and both communication units can exchange data with each other by means of radio communication and the apparatus has a control unit, which can detect at least one status parameter of the apparatus and generate a signal which is dependent on the status parameter and can transfer it via the communication unit of the apparatus to the communication unit of the handheld device, wherein the method comprises the following steps:

the control unit detects a status parameter of the apparatus and generates a signal dependent on the status parameter and transmits the signal to the communication unit of the handheld device via the communication unit of the apparatus, whereby the handheld device after receiving the signal via the radio antenna of the communication unit of the handheld device generates a response signal which it transfers to the communication unit of the apparatus via the communication unit of the handheld device, characterized in that the response signal is transmitted from the communication unit of the apparatus to the control unit of the apparatus and the control unit of the apparatus places a positioning element of the apparatus depending on the response signal, wherein the handheld device has another communication unit with a radio antenna, with which the handheld device can exchange data via a mobile communications network and wherein the handheld device after receiving the signal exchanges data via a mobile communications network via the radio antenna of the another communication unit, wherein the only way for the apparatus to exchange data with a remote computer or a remote server, which does not form part of a local network that is present at the site of the apparatus, is via the handheld device, and wherein the handheld device is programmed to produce an input request to the operator of the handheld device, once the handheld device receives data from a remote server or a remote computer via the mobile communications network, the input request requesting the operator to confirm that this data is to be exchanged with the apparatus.

8. The method according to claim 7, characterized in that the apparatus additionally has a communication unit with a cable connection and the handheld device has a communication unit with a radio antenna or a cable connection, via which it can be connected to a computer network and the communication unit of the apparatus can be connected to the computer network via a cable, and both communication units can exchange data with each other via the computer network or the handheld device can be connected to the cable connection of the apparatus via a cable connected to the cable connection of the handheld device and both communication units can exchange data with each other via the cable.

9. The method according to claim 7, characterized in that the apparatus to treat a fluid has a fluid inlet and a fluid outlet and specifies a flow path through the apparatus between the fluid inlet and the fluid outlet, wherein the flow path leads through means to dry and/or through means to filter the fluid.

10. The method according to claim 7, characterized in that both communication units exchange data by means of radio signals according to the Bluetooth standard, NFC standard or a standard belonging to the IEEE-802.11 family.

11. The method according to claim 9, characterized in that the apparatus has at least one measurement element selected from the following:
- a temperature element to measure the fluid temperature on a measuring point within the apparatus;
- a temperature element to measure the temperature of the means to dry or the means to filter the fluid;
- a pressure sensor to detect the pressure of the fluid at a measuring point;
- an operating-hours meter switched on since a preceding maintenance or a preceding exchange of means to dry the fluid arranged in cartridges;
- a power consumption meter;
- a measurement element to determine fluid composition including one or more of CO sensors, $CO_2$ sensors or $O_2$ sensors;
- a volume flow meter;
- a hygrometer;
- a position measurement device or position sensor of positioning devices of valves installed in the apparatus; and
- a differential pressure gauge.

12. The method according to claim 7, characterized in that the handheld device has a database stored on a non-volatile memory.

* * * * *